UNITED STATES PATENT OFFICE.

JOHN CARNRICK, OF NEW YORK, N. Y.

PREPARED FOOD FOR INFANTS AND INVALIDS.

SPECIFICATION forming part of Letters Patent No. 412,839, dated October 15, 1889.

Application filed August 22, 1889. Serial No. 321,640. (No specimens.)

*To all whom it may concern:*

Be it known that I, JOHN CARNRICK, a citizen of the United States, residing at New York city, in the county of New York and State of New York, have invented certain new and useful Improvements in Prepared Milk-Food; and I do hereby declare the following to be a full, clear, and exact description of the invention, such as will enable others skilled in the art to which it appertains to make and use the same.

This invention relates to a prepared milk-food for infants and invalids, possessing the nutritive qualities and digestibility of human milk.

The object of the invention is to produce a powdered food containing the constituents of human milk, including fat, in the requisite proportions, and which at the same time shall possess good keeping qualities, the fat remaining permanent or free from rancidity—a food in which a portion of the caseine of cows' milk is partly digested and rendered soluble, while the remainder is rendered in characteristics like the caseine of human milk—that is, flocculent and coagulable only in soft curds—and as easily digested by the infant as that in human milk, and in which the added fat is emulsified and partially prepared for assimilation. I have found in practice that a food containing a large proportion of milk-fat will not keep for any length of time, for the reason that such fat soon becomes rancid. In order, therefore, to present a food possessing good keeping qualities, and at the same time possessing the requisite proportion of fat, I substitute for the fat of cows' milk in my preparation a suitable proportion of cocoa-butter, which closely resembles milk-fat in composition, and which remains permanently sweet, and is as easily digested as milk-fat. Moreover, a pure vegetable fat—such as cocoa-butter—has special advantages for the purposes of my prepared food over animal fats derived from sources liable to be contaminated.

In carrying out my invention fresh cows' milk is first treated for the removal of most of its cream, preferably such proportion that the finished dried and powdered product shall contain only about one per cent. of the natural fat. The necessary proportion of cocoa-butter is then added to the milk and melted in the digesting-pan just before treating with pancreatine. Fresh extract of pancreas in the proportion of about one-half to one fluid dram to the pint of milk under treatment is added to the quantity in the pan, and the batch is then heated to about 105° Fahrenheit, and is maintained at that temperature while subjected to gentle stirring or agitation for about fifteen minutes, or a sufficient length of time to render about one-fourth of the caseine soluble, while the remainder of the caseine is rendered in its physical characteristics flocculent, like the caseine of human milk, and the fat emulsified and partially prepared for assimilation. A sufficient quantity of pure milk-sugar is now added to make the proportion of carbo-hydrates equal to that found in a sample of average good human milk. The mixture is then heated to a temperature of about 212° Fahrenheit, or sufficiently high to destroy the digestive power of the pancreatic solution and thoroughly sterilize the milk, and is then evaporated *in vacuo* to a dry condition, and afterward ground to a fine powder. The powdered milk-food is finally placed in hermetically-sealed packages, by which it is kept in a perfectly aseptic condition. Being free from bacterial contamination and practically free from moisture, this food will keep unchanged for any desired period of time. Any tendency to acidity in the milk is prevented by the addition of a small quantity of carbonate or phosphate of soda or lime. In the above process the portion of the caseine which is not peptonized is acted upon by the pancreatic ferment in such a manner as to destroy its tough tenacious character and render it light and flocculent, so that it resembles the caseine of human milk, and will no longer coagulate into hard indigestible curds. This preparation of milk is quite important, for it is well-known that the difficulty experienced by children in digesting cows' milk, either fresh or condensed, is caused by the caseine, which frequently coagulates into lumps or hard curds, which are practically indigestible. These curds by their presence cause irritation, producing various forms of stomach and bowel disorders and cholera-infantum. Milk-sugar being the natural sugar of milk, can be much better digested and assimilated than cane or other sugar, and is not nearly so apt as the other to undergo fermentation and to produce acidity and other disorders in the child's stomach. The cocoa-butter is identical with milk-fat in food value and digestibility, and is therefore perfectly adapted as a nutrient and as a substitute for the milk-fat in my prepared food.

A sample of my prepared food will be found to have about the following composition:

| | | |
|---|---:|---|
| Fat | 10 | per cent. |
| Milk-sugar | 64 | " " |
| Albuminoids | 19 | " " |
| Moisture | 3 | " " |
| Mineral matter | 3 | " " |
| Lime phosphate | ½ | " " |
| Sodium chloride | ½ | " " |
| Total | 100 | |

The lime phosphate and sodium chloride are added during the preparation of the food.

In order to prepare my milk-powder for use, a sufficient quantity of water is added to a measure of the powder to replace that taken away by evaporation, and the resulting fluid, practically identical with human milk in composition and digestibility, may be administered as other milk.

In order to identify my new prepared milk-powder I have named it "Lacto-Preparata."

Having thus described my invention, what I claim, and desire to secure by Letters Patent, is—

1. The process of preparing a milk-food, which consists in removing from sweet milk a portion of the butter-fat and adding to the milk a suitable proportion of cocoa-butter, then partially digesting the milk and preparing the added cocoa-butter for assimilation by means of a digestive ferment, then arresting the digestive process by increasing the temperature and evaporating the mixture to dryness.

2. The process of preparing powdered milk-food, which consists in removing from the milk a portion of its natural fat and substituting therefor a suitable proportion of cocoa-butter, also adding a suitable quantity of milk-sugar, then partially digesting the milk and preparing the cocoa-butter for assimilation by means of a digestive ferment at the proper temperature, then raising the temperature for arresting the digestive process and rendering the product sterile and evaporating the mixture to dryness, and finally reducing to a powder.

3. As a new article of manufacture, partially-digested milk and cocoa-butter.

4. As a new article of manufacture, granular or powdered partially-digested milk and cocoa-butter.

5. An article of manufacture composed of partially-digested milk from which part of the natural fat has been removed, cocoa-butter, and added milk-sugar.

In testimony whereof I affix my signature in presence of two witnesses.

JOHN CARNRICK.

Witnesses:
W. C. KING,
E. VAN ZANDT.